United States Patent

[11] 3,540,755

[72] Inventor Charles E. Babington
 35 Locust Drive, Springboro, Ohio 45066
[21] Appl. No. 730,380
[22] Filed May 20, 1968
[45] Patented Nov. 17, 1970

[54] TANDEM TRAILER WHEEL SUSPENSION
 6 Claims, 5 Drawing Figs.
[52] U.S. Cl. .................................................. 280/104.5,
 267/36
[51] Int. Cl. .................................................. B60g 5/02
[50] Field of Search .......................................... 280/104.5,
 104.5A; 267/36

[56] References Cited
 UNITED STATES PATENTS
2,071,480  2/1937  Williams .................... 280/104.5(A)
2,784,982  3/1957  Detterman .................. 280/104.5
3,129,016  4/1964  Small ........................ 280/104.5(A)

Primary Examiner—Philip Goodman
Attorney—Norman R. Wissinger

ABSTRACT: A suspension system for tandem-wheeled, automotive-drawn trailers comprising a single, nonrotatable main axle extending completely across the trailer bed and spring mounted thereto at each side thereof, and a yoke mounted at each end of the main axle shaft and rotatable in a plane perpendicular thereto wherein the tandem wheels are rotatably mounted near the ends of the yoke as a result of which changes in the relative vertical position of the wheels at either side of the trailer will be accommodated principally by the rotation of the yoke about the main axle and will have little or no effect upon the horizontal position of the trailer bed and the hitch load at the point where the trailer is connected to the vehicle drawing it.

Patented Nov. 17, 1970 3,540,755
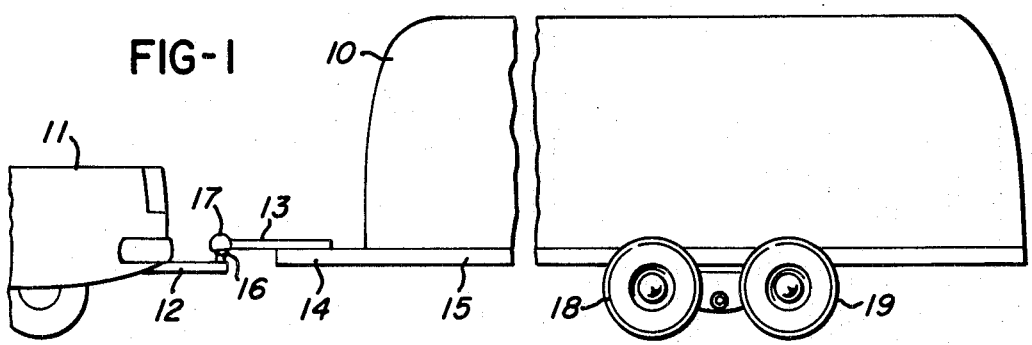
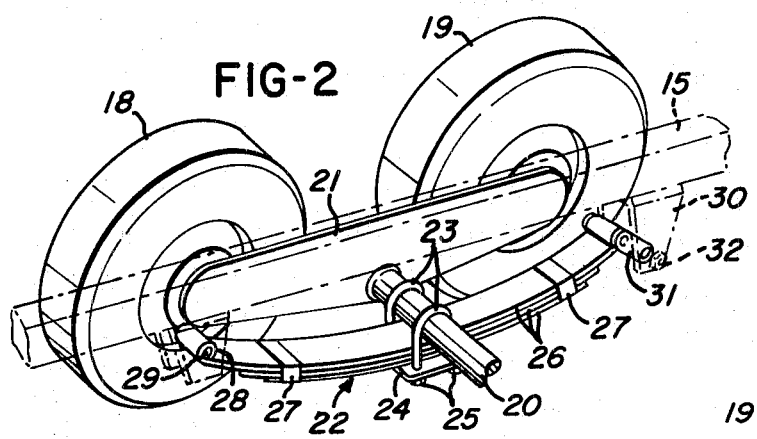
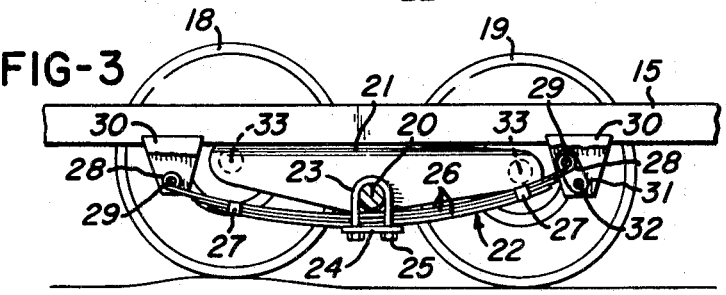
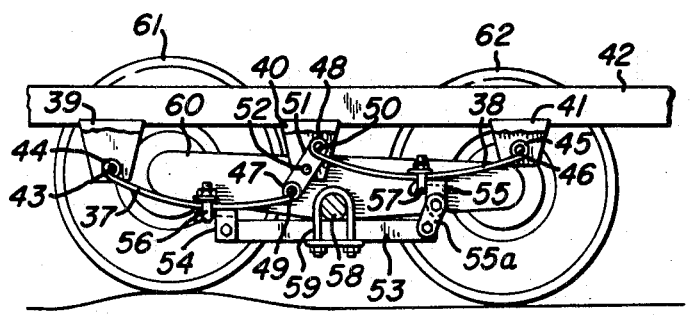
INVENTOR
CHARLES E. BABINGTON
BY *Norman R. Wissinger*
ATTORNEY

TANDEM TRAILER WHEEL SUSPENSION

BACKGROUND OF THE INVENTION

1. Field of the Invention

The present invention relates to vehicular suspension systems and particularly to such systems for accommodating tandem wheel mountings to highway trailers, particularly of the type that are designed to be drawn by automobiles.

2. Description of the Prior Art

With the rapid expansion of the nation's highway system and the steady growth in the number and influence of automobiles, there has been a steady increase in the demand for a variety of trailer-type vehicles to be carried or drawn by passenger-carrying automotive vehicles. Trailers within this category include those designed to haul freight or other goods or chattels including animals as well as those designed to provide living accommodations ranging all the way from the small collapsible camping trailer to the large house trailers or mobile homes, some of which comprise several rooms and kitchen and bath facilities.

In a steadily increasing number of cases, such trailers are of relatively large size and weight, the adequate and lawful accommodation and distribution of which require that the trailer be supported by two or more wheels arranged in tandem fashion on each side thereof. These trailers are commonly associated with the vehicle pulling them by a releasable hitch, often in the form of a ball and socket arrangement, between the front of the trailer or a forward extension of its bed or frame and the rear bumper or a rearward extension from the axle or frame of the pulling vehicle. Now, although the provision of the tandem wheels does improve the load distribution and the amount of pressure exerted by the wheels upon the highway surface and in some ways does improve the handling of the trailer, tandem wheels have presented a serious problem in that they result in substantial changes in the hitch load; i.e., the force exerted by the weight of the trailer at the hitch, upon the automobile. By way of example, if the forward tandem wheel on either or both sides of the trailer should come upon an irregular rise in the road surface, it will become elevated relative to the rear tandem wheel; and this in turn has caused the trailer frame to become upwardly inclined in the direction of the automobile thereby tending to lift the trailer away from the automobile at the hitch. Conversely, if the rearward of the tandem wheels should encounter such a surface irregularity, the effect in the case of conventional suspensions has been to cause the trailer frame to become downwardly declining in the direction of the automobile thereby tending to force the trailer against the automobile at the hitch. Where either of the trailer wheels encounters a road depression rather than projection, the reverse effect upon the relationship between trailer and automobile at the hitch takes place.

When it is considered that normal highway and road surfaces are characterized by a variety of such surface irregularities and that, especially in the case of camping trailers, it is not uncommon for the trailer to be drawn over surfaces that are more bumpy and irregular than normal highways, it can be appreciated that these changes in the relative disposition of the trailer and automobile at the hitch and in the hitch loading resulting therefrom are experienced with considerable frequency. Moreover, this frequency is substantially increased by the fact that almost all such irregularities are encountered in rapid sequence, first by the front tandem wheel and then by the rear. The rapidity of this sequence and the frequency of the resultant rocking or vibration is then only further enhanced by increases in the speed at which the vehicle is drawn over the road surface; and this of course, in modern highway driving, is also a steadily rising factor.

The result of this constant shifting and rocking has been the obvious annoyance and discomfort of persons riding within the automobile which, in response to the changes in the hitch loading, itself rocks and jerks, usually to the accompaniment of considerable noise, the accumulative effect of all of which is the early onset of driver fatigue. On the other hand, the fatigue is not limited to the driver or occupants of either the automobile or the trailer but is also upon the parts of these respective vehicles, especially those involved in the suspension, all of which are themselves subject to premature fatigue failures. Since most of the passenger vehicles by which such trailers are drawn are themselves suspended by constructions the capacity of which only marginally exceeds those anticipated for the automobile without a trailer, the premature failure of the springs and shock absorbers on the automobile has been a particularly serious problem.

While the prior art has resorted to a variety of spring and/or shock absorber arrangements to absorb or compensate for changes in hitch loading of the type discussed above, these expedients have provided at best only a nominal degree of improvement and in almost all cases have been so complicated, cumbersome, and expensive that their use has been precluded by weight, space and cost factors, especially as they might have been applicable to automobile drawn trailers wherein the very problems they have sought to solve have been most pronounced and most critical.

It is accordingly an object of the present invention to provide an improved suspension system for tandem wheeled trailers designed to be drawn by automotive vehicles.

Yet another object of the invention is to provide such a suspension system which will substantially eliminate changes in the hitch load of the trailer upon the rear of the automobile as it pulls the trailer over irregular surfaces.

Still another object of the present invention is to provide such a suspension which will act to keep the trailer bed or frame substantially parallel with the overall highway surface despite surface irregularities therein thereby to prevent rocking of the trailer or the jerking of the pulling vehicle.

Yet another object of the present invention is to provide such a suspension system which may be applied to automobile drawn trailers without substantially adding to their weight and cost of manufacture and without encroaching upon the space within the trailer itself or its road clearance.

SUMMARY OF THE INVENTION

These and other objects and advantages which will appear from a reading of the following disclosure are achieved first, by the elimination of the dual axles that are normally involved in tandem wheel assemblies and the substitution therefor of a single axle or transversely extending shaft member which is spring mounted inwardly of each end thereof to opposite sides of the trailer bed or frame and which has at each of its ends outwardly of the spring mountings a longitudinally extending yoke or wheel-carrying brace with the front and rear of each which are associated the tandem wheels. The transversely extending single main axle or shaft is held against rotation by the spring mounting while the wheel carrying yokes at each end of the shaft outwardly of the spring mountings are journaled for free rotational movement about the main axle. The wheels associated with the yoke are mounted upon conventional stub shafts or spindles affixed thereto and projecting outwardly therefrom about which the wheels may be journaled for free rotational movement in the manner of conventional trailer wheels. It has been found that the spring mounting of the main axle shaft provides absorption of vertically acting forces transmitted from the trailer wheels in the same manner as springs associated with conventional trailer axles, with the important exception however of the fact that the wheel-carrying yoke, acting as a lever arm, substantially reduces the vertical movement of the main axle relative to the vertical movement of either of the tandem wheels. For example, where, in the preferred and usual case, the main axle shaft is midway between or equidistant from the stub shafts or spindles of the tandem wheels on either side of the trailer, a vertical displacement of either of the tandem wheels of say 6 inches will result in only a 3 inch vertical movement of the main axle shaft. The interposition of the freely rotatable wheel-carrying yoke between the wheels and the main axle moreover resolves all of the nonvertical forces that tend to be transmitted from the wheel into a vertical component acting upon the main axle thereby substantially eliminating any tendency of the nonvertical forces to result in a displacement of the trailer bed or frame from its normally parallel relationship with the road surface upon which the trailer is moving. In addition to reducing the fatiguing influences of such movements upon the structural components of the trailer, these effects of the within suspension also substantially reduce the impact loading upon the tires to the prolongation of their operational life.

DESCRIPTION OF THE DRAWING

The invention thus generally described and to be hereinafter further described in connection with certain preferred embodiments thereof may be more clearly understood by reference to the drawings wherein:

FIG. 1 is an elevational view, partially broken away, of an automobile-drawn, tandem wheeled trailer embodying the suspension of the present invention and the rear portion of the automobile to which it is mounted.

FIG. 2 is a perspective view of a preferred embodiment of the suspension system of the present invention and of a fragmentary portion of one rail, shown in phantom, of the trailer with which the suspension is associated.

FIG. 3 is an elevational view partially broken away of the embodiment illustrated in FIG. 2 showing the response of the suspension system to a road irregularity.

FIG. 4 is a plan view partially broken away of the embodiment illustrated in FIGS. 2 and 3.

FIG. 5 is an elevational view of another preferred embodiment of the invention.

DESCRIPTION OF THE PREFERRED EMBODIMENTS

Referring now to FIG. 1, a trailer 10 of the type particularly adapted to benefit from the teachings of this invention is shown to be mountable to the rear of a motor vehicle such as a passenger car 11 to either the rear bumper or rear end of the frame of which is mounted a bracket 12 to provide for a hitching connection to an oppositely projecting arm or extension 13 mounted to the front end of the trailer or an extension 14 of its bed or frame 15. To accommodate changes in the alignment of the trailer and automobile as it goes around curves or over hills, one popular form of hitch for such vehicles comprises the ball 16 and the socket 17 associated respectively with the automobile bracket 12 and the trailer bracket 13. Conventional locking means (not shown) involving means for opening up the socket 17 to insert it over the ball 16 and for thereafter closing the socket so that it will be held around the ball are provided to insure permanency. Although the trailer 10 is shown to have the general silhouette of habitable trailer such as a camping trailer, it is to be understood that any type of trailer may benefit from the suspension of this invention which is however limited to those trailers wherein tandem wheels are desired for ease of handling, safety or greater weight distribution. Users of small travel trailers prefer tandem wheels for safety in event of tire failure, for stability in crosswinds and the like. Trailer builders on the other hand, are reluctant to employ tandem wheels on trailers intended to be drawn by passenger automobiles because of the complaints of roughness resulting from the changing hitch loading. Tandem wheels of the type thus desired are such as are shown at 18 and 19 of the drawings, it being understood that this particular wheel combination is provided on both sides of the trailer 10.

As can be seen in FIG. 1 but as is more clearly shown in FIGS. 2, 3, and 4, the suspension system according to the present invention begins with the elimination of the dual axles that are normally involved in tandem wheel assemblies and the provision of a single axle 20 which extends transversely across the trailer and through the wheel-carrying yoke or brace member 21 near each end thereof. The axle 20 is connected to spring means such as the leaf spring assembly 22 as by a U-bolt clamping assembly comprising U-bolts 23 partially encircling the axle on opposite sides of the leaf spring assembly, the clamping plate 24 and the threaded fasteners 25. The leaf spring assembly itself may comprise one or more separate metallic leaves 26 held together by the clips 27 which will permit sliding of the respective leaves as the bundle of leaves flexes. Where, as is the usual case, the respective leaves are of different lengths, the longest one terminates at each end in an eye 28 through which a spring mounting pin 29 passes to pivotally connect the spring ends to the spring hangars or brackets 30 which are welded or otherwise permanently affixed to the trailer bed or frame such as to the rail 15 thereof and from which they depend in spring receiving fashion. While one end of the assembly must be directly connected to the hangar simply by the passage of the spring pin 29 through the eye 28 and through companion aligned openings in the hangar 30, the other end of the spring assembly may be associated with the hangar via the pivotal linkage comprising the linking bar 31 pivotally connected at one end to the spring eye 28 by the passage of the pin 29 therethrough and at its other end to the laterally spaced depending arms of the spring hangar 30 by the bolt and nut assembly 32 passing therethrough. The effect of this linkage is to allow the free flexing of the spring leaves 26 without offering any resistance to the change that takes place in the spacing between the eyes 28 as the leaves tend to straighten or to become more bowed.

The yoke 21 is rotatably mounted upon the axle 20 at each end thereof outwardly of the point at which the spring is fastened in the manner described above, the yoke being an elongated rigid member composed of steel or other load carrying material. At longitudinally spaced points on the yoke and usually near each of the front and rear ends thereof is mounted or affixed a spindle or stub shaft 33 upon which the wheels 18 and 19 are rotatably mounted. Since the weight of the vehicle is carried initially at the point of contact between the yoke and the axle and thereafter by the contact between the wheels and the spindles, these connections must be provided with bearings and so journaled as to accommodate free rotatable movement on the one hand but to carry the substantial loads on the other. The particular manner of journaling the rotatable members is not a feature of the present invention, and the same may be accomplished by a variety of conventional means involving roller bearings, cup and cone ball-bearing assemblies and the like. While the nature of the U-bolt clamping of the leaf spring assembly to the axle usually results in the axle's being nonrotatable relative to the spring assembly or otherwise, this is not essential; and it is only important that the yoke member should be freely rotatable relative to the axle shaft whether or not the latter is stationary. On the other hand, because the main axle shaft extending transversely across the trailer may, according to the present invention, be nonrotatable, an additional and desirable feature of this invention is that the axle may be offset as to that portion thereof spanning the distance between the opposite sides of the trailer thereby to increase the clearance between the road surface and the axle.

With this arrangement of parts thus assembled, it can be seen that the main axle or shaft 20, the yoke members 21 affixed near the ends of the axle and the wheels rotatably mounted upon the yoke members are completely separated from the trailer 10 and more specifically from the frame 15 thereof except for the association of the axle with the leaf spring assembly which is in turn suspended from the trailer frame. The wheels themselves are then further isolated by the yoke member which is connected only to the spring-suspended axle and, as above described, is freely rotatable relative thereto. It has been found that the result of this unique combination of the suspension components is that the leaf spring assembly will function in the manner of conventional leaf spring suspension systems to absorb the bulk of the road shock that is normally transmitted from the road contact of the wheels to the frame or vehicle body and to maintain the proper wheel alignment for proper tracking and controlled movement of the vehicle. Additionally however, the effect of the leaf spring assembly combines with that of the rotatable yoke practically to eliminate any effect on the disposition of the trailer relative to the roadbed of any road surface irregularities which the wheels might contact. Thus, as illustrated in FIG. 3, if the forward of the tandem wheels on one side of the trailer should come upon a rise in the road surface causing the forward wheel to become elevated relative to the rear wheel and to the trailer frame, the effect on the suspension system according to this invention will be that the yoke will rotate to the extent that is necessary to accommodate the movement of the front wheel and will transmit all of the force resulting from the wheel displacement to the centrally connected main axle which, because of its association with the leaf spring assembly and the trailer, will transmit the force substantially as a vertically acting one.

As best shown in FIG. 4, the rotational axis of the yoke 21 established by the pivotal connection of its centrally positioned hub 34 to the main axle shaft 20 is preferably equidistant between the wheel shafts 33. The effect of the yoke as a lever arm acting about the opposite wheel as a fulcrum is then such that the vertical displacement of a wheel causes only one-half of such displacement of the axle shaft responding thereto. This factor of course further reduces the shock transmitted to the trailer frame that would normally result from contact between the wheels and irregular road surfaces. As still a further means of absorbing shock, it is to be understood that conventional shock absorbers may be conveniently applied to the suspension either between the leaf spring assemblies and the frame to which they are affixed or between the yoke or wheels and the frame in a manner that is well understood by the prior art and comprises no part of the present invention. It is of course to be further understood that the total dampening effect resulting from the suspension herein described will be achieved regardless of which of the tandem wheels is displaced in response to the road surface and regardless of whether such displacement is upward or downward relative to the trailer itself. Further in connection with FIG. 4, it will be observed that the load-bearing connection between the yoke 21 and the axle 20 at the hub 34 is in the same plane as the load bearing connections between the shafts 33 and the wheels 18 and 19 respectively as a result of which all of the transmission of the load between the trailer and the road surface occurs in the same plane thereby avoiding any transverse leverage effect between the load on the wheels and that on the axle and insuring that the total loading will be thereby most evenly distributed.

A modification of the suspension of the present invention such as that illustrated in FIG. 5 may be employed where, for reasons of performance or design, two separate leaf spring units or assemblies are desired on each side of the trailer, representing a spring unit for each of the tandem wheels as is found in conventional or existing tandem wheel trailer structures. In this embodiment the two spring units 37 and 38 are shown to comprise a single resilient metallic leaf, though it is to be understood that a plurality of such leaves superimposed in assemblies similar to that shown in FIGS. 2 and 3 could be used as well. In a manner similar to that described in connection with the leaf spring assembly of FIGS. 2, 3 and 4, these springs are associated with the spring hanging brackets 39, 40 and 41 which are welded, bolted or otherwise affixed to the trailer bed or frame 42. Again the spring members terminate in eyes through which pass pins such as the pin 43 through the eye 44 to pivotally connect the one end of the spring 37 with the hangar 39. Similarly, the spring 38 terminates in the eye 45 through which passes the pin 46 to mount the spring to the hangar 41. To accommodate the changes in longitudinal dimension resulting from flexing of the springs however, the opposed eyes 47 and 48 of the springs 37 and 38 respectively are pivotally connected by the pins 49 and 50 respectively to the link or arm 51 which is itself pivotally mounted by the pin 52 to the hangar 40. At this point, it can be seen that the spring suspension thus far described is capable of providing two separately acting spring assemblies with which two separate axles may be associated to carry the tandem wheels in the manner of prior art tandem wheel trailers. The teachings of the present invention are therefore readily adaptable to such prior art structures by the simple expedient of removing the dual axles and replacing them with the single axle and wheel-carrying yoke assembly such as described in connection with FIGS. 2, 3 and 4.

To accomplish this transposition, it is necessary first that the separate springs be further integrated by the tie bar or rod 53 which, though it integrates the action of the separate springs on the one hand, must at the same time allow for their independent flexing and the attendant changes in the longitudinal distance between their respective ends. To accomplish this, the integrating bar 53 is pivotally connected at each of its ends to the brackets 54 and 55 which are in turn fastened to the springs 37 and 38 respectively by the U-clamps 56 and 57. Again, to compensate for the change in linear distances resulting from the flexing of the springs, one of the clamping brackets such as 55 may be in two parts and include the pivotal link 55a which is pivotally connected to the fixed base 55 by the pin 56. The spring assembly thus described then corresponds to the single leaf spring assembly in the embodiment shown in FIGS. 2, 3 and 4, as a result of which the main axle 58 may be associated with the tie bar 53 by the U-clamp 59. In the manner of the previously described embodiments, the main axle thus associated with the trailer carries the wheel-carrying yoke 60 which is freely rotatable relative to the axle and in turn carries stub shafts upon which the tandem wheels 61 and 62 may be rotatably mounted.

While the within invention has been described in connection with certain preferred embodiments and modifications thereof, it is to be understood that the foregoing particularization has been for the purposes of illustration only and does not limit the scope of the invention as it is defined in the attached claims.

I claim:

1. A suspension system for tandem wheels providing the principal support for the load represented and carried by a vehicular drawn trailer comprising a single, nonrotatable main axle extending completely across the trailer bed transversely thereof, a leaf spring assembly shackled to each side of said trailer bed and fixedly mounted to said axle near each of the ends thereof, a yoke pivotally mounted at each end of said axle outwardly of said leaf spring assemblies and rotatable about said axle in a plane perpendicular thereto and tandem wheels each rotatably mounted to spindles affixed to and projecting laterally from said yoke at spaced points on opposite sides of the pivotal connection of said yoke to said axle.

2. A wheel suspension system according to claim 1 wherein said yoke is rotatably associated with said axle in the plane defined by the rotatable association of each of said wheels with the spindles on said yoke.

3. A wheel suspension system according to claim 1 wherein the rotatable mounting of said yoke to said axle is at a point which is equidistant from each of said spindles.

4. A wheel suspension system according to claim 1, wherein said leaf spring assembly comprises two separate leaf spring units, each of which, at the end most remote from the other, is pivotally connected to the trailer bed and is connected to such other by a tie bar pivotally connected to each of said spring units and to said axle.

5. A wheel suspension system according to claim 4 wherein the ends of said units not so connected to the trailer bed are pivotally connected to a link which is itself pivotally mounted to said trailer bed.

6. A wheel suspension system according to claim 4 wherein the pivotal connection between one of said spring units and said tie bar comprises at least two links which are themselves pivotally joined and one of which is fixedly mounted and the other of which is pivotally mounted relative to said spring unit and said tie bar.